Patented Nov. 3, 1942

2,300,662

UNITED STATES PATENT OFFICE 2,300,662

CARROTING SOLUTION

Constantine F. Fabian, Brookfield, Conn.

No Drawing. Original application December 10, 1940, Serial No. 369,433. Divided and this application August 15, 1942, Serial No. 454,920

7 Claims. (Cl. 8—112)

This invention relates to the art of carroting animal fiber and to a carroting solution used in the carroting process. The invention aims to preserve the strength, weight, and natural color of the fur, and is a division of my co-pending application Serial No. 369,433, filed December 10, 1940, for an invention in the Art of carroting animal fibers and carroting solutions for same.

In my study of physical and chemical manifestations in animal fiber prior to and after carroting processes, I have observed and established the fact that great changes have occurred in the fiber in two respects capable of measurement, namely, decrease of tensile strength of the fiber, and loss of weight in the manufacture of felt hats. I have further established the fact that these two factors accompany each other, that is to say, the greater the decrease of tensile strength, the greater the loss of weight.

The reason for this decrease in tensile strength and loss of weight is that during the carroting a strong hydrolytic action takes place and the fiber substance is degraded into soluble peptones and amino-acids, and the greater the formation of soluble peptones and amino-acids the greater will be the decrease in tensile strength and loss of weight.

The effects above described are observed whether the carroting solution be of the older mercury nitrate type or of the now commonly used non-mercuric type, and specifically that disclosed in Fabian Patent No. 2,169,997. The patent just mentioned discloses a carroting solution having a high concentration of nitric acid in combination with hydrogen peroxide and without any metal or mineral salt present therein. In the following description carroting solutions of the type disclosed in the above mentioned patent will be denominated as solutions containing high concentration of ntiric acid. Carroting solutions containing high concentration of nitric acid, which do not contain any heavy metal salts, will apply whether these solutions contain the inhibitors disclosed in Fabian Patents Nos. 2,087,857, 2,087,856, 2,087,855, 2,087,854 and 2,048,645 or not and likewise apply whether or not the solutions contain the neutral salts of Patent No. 2,144,487.

I have discovered that the addition of products of protein degradation, as for example gelatin, gelatin peptones, cystine, glycocols and leucin to carroting solutions of the high concentration nitric acid type preserve the tensile strength and weight of the fur during the felting process, thereby yielding superior felt. I have also discovered that this result does not occur when the same substances are added to the older metallic types of carroting solutions.

The probable explanation of the inhibiting action of products of protein degradation in these carroting processes utilizing carroting solutions of the high nitric acid concentration type can be found in the possibilities of increasing the viscosity of the film formed on the fiber during the first stage of hydrolytic action by strong acids. Such a product as gelatin peptone in the carroting solution coagulates the components of the film on the surface of the fiber and prevents excessively deep penetration of the strong hydrolytic acid into the substance of the animal fiber. The effect of the addition of peptones and amino-acids is to provide a buffer which controls the depth and the intensity of the hydrolytic action of the hereinbefore mentioned strong acids on the fibers.

In addition to the preservation of the tensile strength and weight of the fur during the carroting process, I have observed and established as a fact that the presence of products of protein degradation in carroting solutions of the high nitric acid concentration type greatly prevents discoloration of the fiber, and furthermore that the preservation of the natural color of the fur is even more effective when the products of protein degradation are coordinated in the carroting solution with so-called anti-oxidants such as those mentioned in U. S. Patent No. 2,144,487.

The probable explanation is that such a product as gelatin inhibits excessive dispersion of the aniline dyes used in a carroting solution, and acts on them as a lake, converting anti-oxidants on the fiber into insoluble compounds.

The amounts of the products of protein degradation employed in the carroting solutions can be varied in wide range, depending upon the concentration of hydrolytic agents used in the carroting composition. The higher the concentration of the hydrolytic agents, the greater the amount of gelatin peptone, for example, is required. However, I prefer to use not more than 3% of gelatin or gelatin peptone, and not more than 2% of cystine. Gelatin can be used directly by being dissolved in hot water, or converted into gelatin peptone by prolonged boiling in water.

The invention will be best understood by reference to the following examples of carroting solution which can be prepared according to the general principles of my invention, and intended for application to the animal fibers. It will be understood that in these examples the carroting composition comprises an aqueous solution of the chemical substances named, the weights of which are given in percentages of the total weight of the solution.

Example I

| | Per cent |
|---|---|
| Nitric acid (tech. 40° Bé.) | 15 |
| Hydrogen peroxide (100 V.) | 20 |
| Gelatin | 3 |
| Water | 62 |

Example II

| | Per cent |
|---|---|
| Nitric acid (tech. 40° Bé.) | 14 |
| Hydrogen peroxide (100 V.) | 15 |
| Sodium bisulphite of 1:2-dihydroxy-anthraquinone - $\beta$ - quinoline ($C_{17}H_9NO_4 + 2NaHSO_3$) | 0.3 |
| Cystine | 1.5 |
| Water | 69.2 |

Example III

| | Per cent |
|---|---|
| Nitric acid (tech. 40° Bé.) | 12 |
| Sodium sulphate (anhydrous) | 3 |
| Ethyl alcohol | 1 |
| Sodium salicylate | 0.01 |
| Metaphosphoric acid | 0.05 |
| Hydrogen peroxide (100 V.) | 14 |
| Sodium salt of 1-amino-2-methyl-4-o-sulpho - p - tolylamino - anthraquinone ($C_{22}H_{17}N_2O_5SNa$) | 0.1 |
| Gelatin peptone | 2 |
| Water | 67.84 |

What is claimed is

1. A composition for use in the carroting of animal fiber consisting of an aqueous solution containing a high concentration of nitric acid in the magnitude of 12% or more, hydrogen peroxide and an amino-acid from the group originating in protein degradation, said amino-acid being present in an amount not exceeding 3% by weight of the total weight of the solution.

2. A composition for use in the carroting of animal fiber consisting of an aqueous solution containing a high concentration of nitric acid in the magnitude of 12% or more, hydrogen peroxide and cystine, said cystine being present in an amount not exceeding 2% by weight of the total weight of the solution.

3. A composition for use in the carroting of animal fiber consisting of an aqueous solution containing a high concentration of nitric acid in the magnitude of 12% or more, hydrogen peroxide and cystine, said cystine being present in an amount not exceeding 1.5% by weight of the total weight of the solution.

4. A composition for use in the carroting of animal fiber consisting of an aqueous solution containing a high concentration of nitric acid in the magnitude of 12% or more, hydrogen peroxide and gelatin peptone, said gelatin peptone being present in an amount not exceeding 2% by weight of the total weight of the solution.

5. A composition for use in the carroting of animal fiber consisting of an aqueous solution containing nitric acid in high concentration, hydrogen peroxide, anti-oxidants and gelatin peptones in an amount not exceeding 2% by weight of the total weight of the solution.

6. A composition for use in the carroting of animal fiber consisting of an aqueous solution containing 14% by weight of nitric acid (tech. 40° Bé.), 15% by weight hydrogen peroxide (100 V.), 0.3% by weight of sodium bisulphite of 1:2-dihydroxyanthraquinone-$\beta$-quinoline, 1.5% by weight of cystine, and 69.2% by weight of water.

7. A composition for use in the carroting of animal fiber consisting of an aqueous solution containing 12% by weight of nitric acid (tech. 40° Bé.), 14% by weight of hydrogen peroxide (100 V.), 3% by weight of anhydrous sodium sulphate, 1% by weight ethyl alcohol, 0.01% by weight sodium salicylate, 0.05% by weight of metaphosphoric acid, 0.1% by weight of the sodium salt of 1-amino-2-methyl-4-o-sulpho-p-tolylamino-anthraquinone, 2% by weight of gelatin peptone, and 67.84% of water.

CONSTANTINE F. FABIAN.